Figure 1:
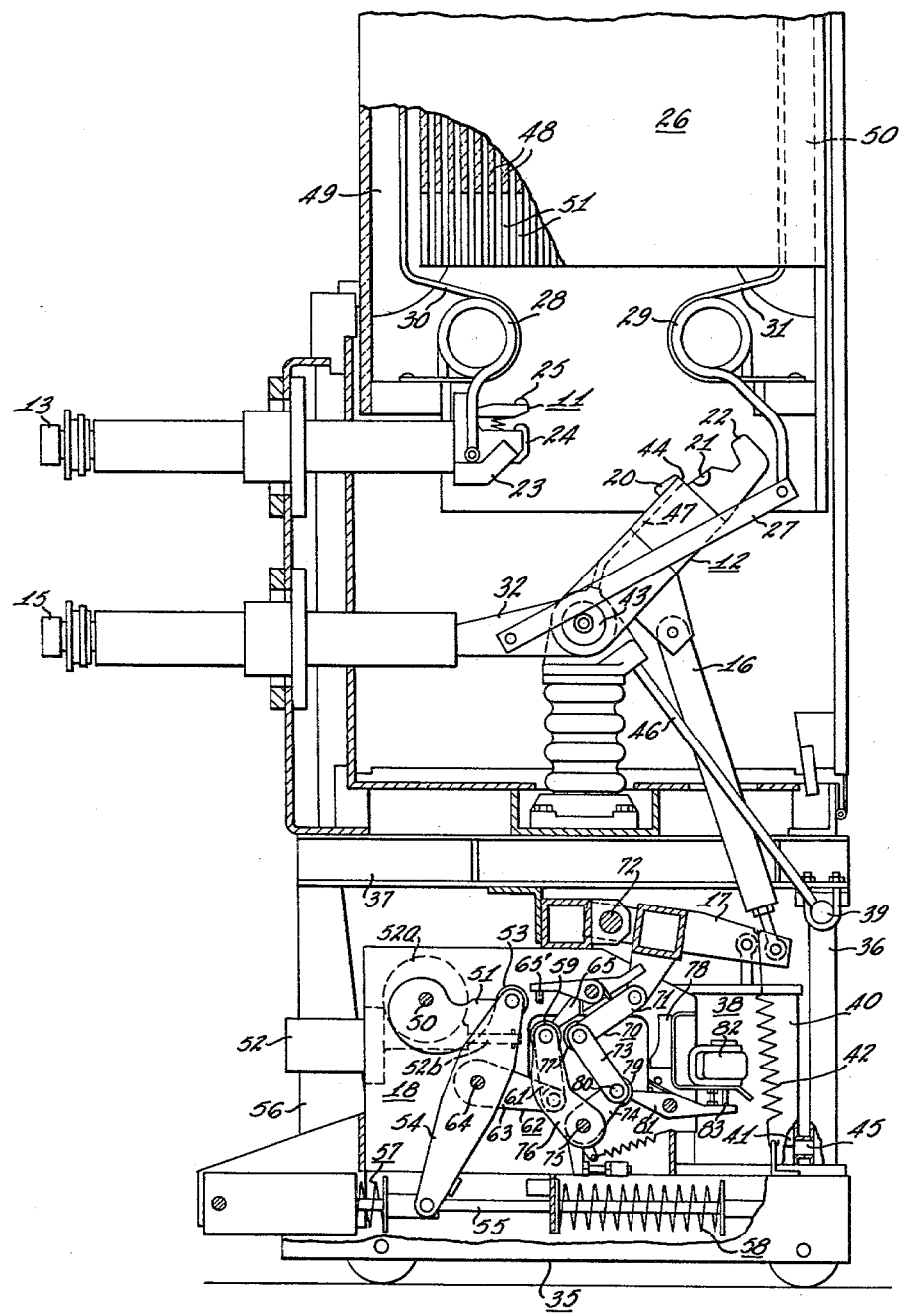

March 16, 1965     H. L. PEEK     3,174,022
CIRCUIT BREAKER HAVING STORED ENERGY OPERATING MECHANISM
EMPLOYING A PAIR OF OVERCENTER TOGGLES
Filed July 19, 1962     3 Sheets-Sheet 1

Inventor
Henry L. Peek
by Warren F. B. Lindsley
Attorney

United States Patent Office 3,174,022
Patented Mar. 16, 1965

3,174,022
CIRCUIT BREAKER HAVING STORED ENERGY OPERATING MECHANISM EMPLOYING A PAIR OF OVERCENTER TOGGLES
Henry L. Peek, Wellesley, Mass., assignor to Allis-Chalmers Manufacturing Company, Milwaukee, Wis.
Filed July 19, 1962, Ser. No. 210,949
8 Claims. (Cl. 200—153)

This invention relates to stored energy type of operating mechanisms which may be used with an electric circuit breaker. More particularly, the invention relates to an arrangement for controlling the operation of such a mechanism.

In the operation of circuit breakers the efficiency of toggles for effecting tripping and closing of the contact members has long been recognized and has been employed in various combinations with different types of latching and tripping arrangements. In certain types of circuit breaker application it is important to reclose the circuit breaker within a very short time interval after the breaker is initially tripped to open circuit position. This is a rather complex problem in most mechanically trip free operating mechanisms because tripping of the usual trip free latch allows the mechanism to collapse during circuit breaker opening and renders the mechanism incapable of again transmitting closing thrust until it is reset to a thrust transmitting condition. This resetting operation ordinarily requires a considerable amount of time and, thus, necessitates a delay that tends to interfere with reclosing the breaker within the very short time available after tripping.

Heretofore, the reclosing mechanisms employed hydraulic or pneumatic motors which require the reversal of piston action before the resetting operation of the breaker can be completed. The time necessary for reversing a piston in its stroke to make reclosing of the breaker possible usually restricted the reclosing time of the breaker. Solenoid operating mechanisms have been used in place of hydraulic or pneumatic motors for driving the mechanically trip free operating mechanism. Although the force output characteristics of a solenoid which increase as the breaker approaches full closed position is ideal, this type of electrical device is useless for closing the breaker if its source of electrical energy is temporarily lost. Further, it increases in both cost and in sluggishness with increase in the size of the circuit breaker structure.

In accordance with the invention claimed a new and improved stored energy closing device is provided which closely duplicates the increasing force characteristics of a solenoid closing mechanism. This not only overcomes the cost and time delay characteristics of these prior art devices but also provides a stored operation for use if the closing motor voltage is temporarily lost. The claimed operating mechanism comprises in combination a force transmitting structure such as, for example, a relatively movable contact structure. A tripping means is arranged for controlling the contact structure and comprises a first collapsible toggle having one link thereof connected to the contact structure. Spring means are provided for causing collapse of the first toggle and actuation of the contact structure in a given direction. Means including a latch is provided for preventing collapse of the first toggle. A further means associated with the latch restriction structure is utilized for releasing the latch at a particular time. Actuating means comprising a second overcenter toggle is provided for driving the first toggle to its overcenter position to actuate the contact structure in a second direction and to charge the spring means. The second toggle engages the knee of the first toggle during movement of the second toggle to its overcenter position and actuates the first toggle to its overcenter position.

It is, therefore, one object of this invention to provide a new and improved force transmitting mechanism.

Another object of this invention is to provide a new and improved stored energy type of operating mechanism employing a new arrangement for controlling the operation of this mechanism.

A further object of this invention is to provide a new and improved mechanically trip free operating mechanism employing energy storing means such as springs which are held in charged condition by suitable restraining means and can be released readily to permit the springs to discharge and drive the breaker to either open or closed position.

A still further object of this invention is to provide a new and improved energy storage type of operating mechanism in which the decaying force characteristics of force transmitting springs are matched to the increasing force characteristics of a new and improved toggle operating means so that the force necessary at the end of the closing stroke of the contacts of a circuit interrupter can readily overcome the high forces encountered when closing in against a short circuit current without producing damaging contact velocities when closing in against a no load condition.

A still further object of this invention is to provide a new and improved stored energy type of operating mechanism which is simple and inexpensive to manufacture and operates to prevent circuit breaker pumping in the event the breaker is closed on a fault.

A still further object of this invention is to provide a new and improved stored energy type of operating mechanism which can be successfully operated by a small electric motor of minimum size and force output.

A still further object of this invention is to effect high speed resetting of the circuit breaker mechanism which does not significantly interfere with the opening of the breaker but is capable of providing resetting forces which are maintained at a high level from the instant of tripping until resetting is completed.

Figure 2:
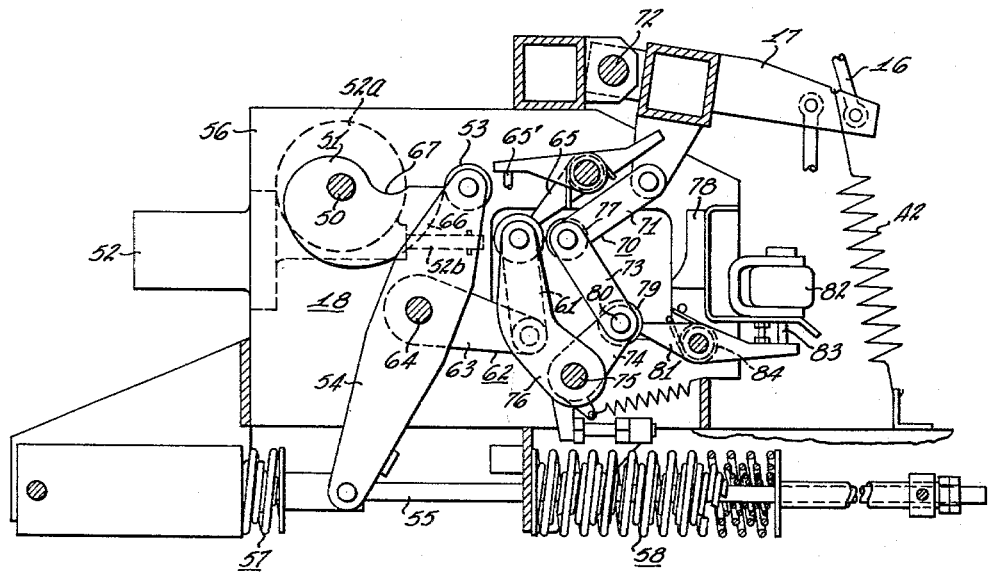
Figure 3:
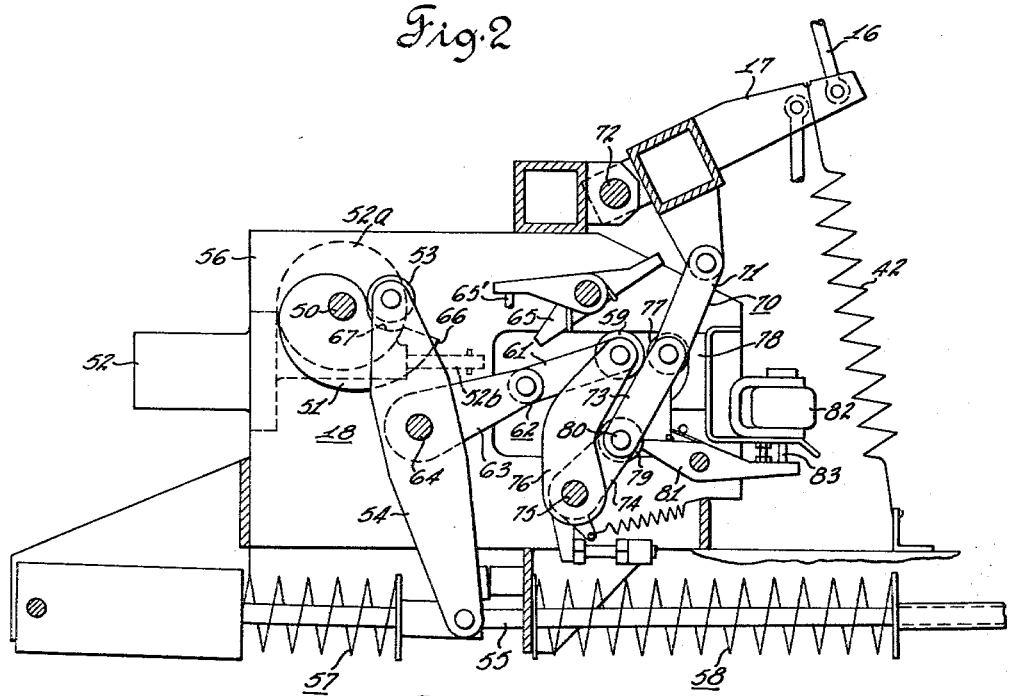
Figure 4:
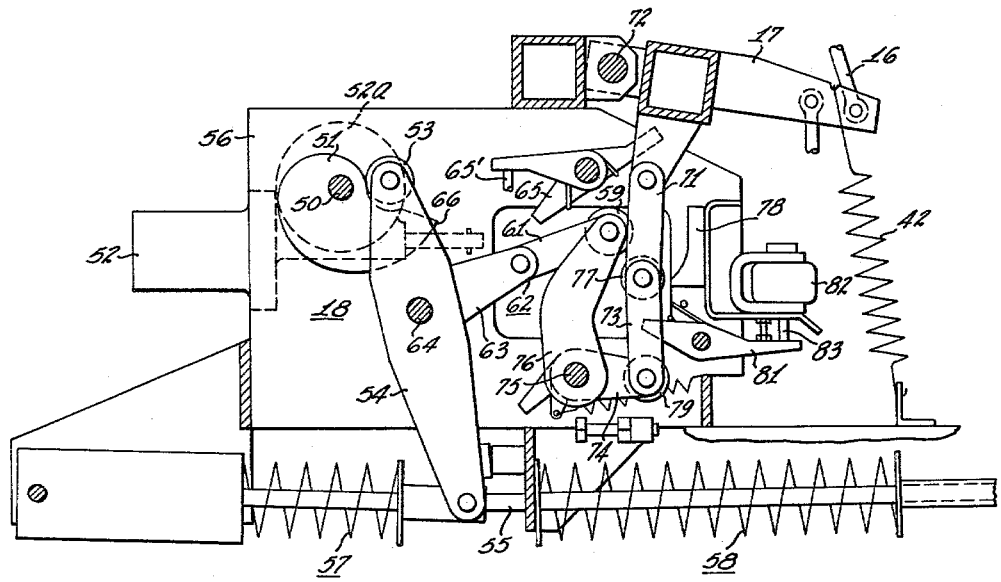

Objects and advantages other than those set forth will be apparent from the following description when read in connection with the accompanying drawings, in which:

FIG. 1 is a view in vertical cross section of a magnetic blowout type of circuit breaker employing the present invention; and FIGS. 2, 3 and 4 illustrate in cross section three different positions of the tripping devices and associated mechanism by which the circuit breaker is operated and restrained in various contact positions.

Referring more particularly to the drawings by characters of reference, FIG. 1 illustrates a magnetic blowout type of circuit breaker employing an arc chute into which the arc is forced by the magnetic blowout field and extinguished. The power circuit to be interrupted includes relatively movable contacts between which the arc is formed when the contacts separate at the entrance to the arc chute. Specifically, the contacts comprise a fixed contact structure 11 and a coacting movable contact structure 12. The fixed contact structure is electrically connected to a lead in conductor stud 13 defining one terminal of the breaker, and the movable contact structure 12 comprising a pivoted switch arm having an arcing contact mounted at one end thereof is electrically connected to a conductor stud 15 defining the other breaker terminal. The pivoted contact structure 12 is suitably operated between open and close circuit positions by an operating rod 16 that is connected through a crank 17 to a motor drive actuating means 18.

FIG. 1 illustrates the movable contact structure 12 in contact open position, the coacting main and arcing contacts 20 and 22, respectively, of the movable contact structure 12 being spaced apart from corresponding main and arcing contacts 23 and 25, respectively, of the fixed contact structure 11. A pair of lugs 21 (one of which is shown in FIG. 1) is integrated with arcing contact 22 and extends from opposite sides of a web portion of arcing contact 22. Lus 21 together with the web portion of the arcing contact 22 form an engaging surface which coacts with that of a block of insulating material 24 on the stationary contact structure 11 to limit overtravel of the movable contact structure 12 in the closing direction. In breaker closed position the stationary arcing contact 25 is shunted by stationary main contact 23. Opening of the breaker by the clockwise rotation of the breaker movable contact structure 12 causes, in the sequence named, separation of the main current carrying contacts 20, 23 and the arcing contacts 22, 25. The power arc is formed at the entrance of an arc chute 26.

Arc chute 26 is illustrated as being provided with magnetic blowout means comprising blowout coils 28 and 29 arranged so as to cause the arc formed between the contacts 22 and 25 to be blown by the magnetic field into arc chute 26. Blowout coil 28 is connected at one end thereof to a conductive arc runner 30 and at the other end thereof immediately adjacent main contact 23. Blowout coil 29 is connected at one end thereof to a conductive arc runner 31 and at the other end thereof to a lower terminal extension 32 through a conductive bar 27.

Upon separation of the arcing contacts 22 and 25 in a circuit interrupting action the arc terminal is tranferred from stationary arcing contact 25 to arc runner 30, thereby inserting blowout coil 28 in the arcing circuit traced from the point of connection of blowout coil 28 on the upper terminal block immediately adjacent main contact 23 through blowout coil 28 to arc runner 30, through the arc to movable arcing contact 22. As the arc, now established between arc runner 30 and the movable arcing contact 22, is attenuated by the clockwise rotation of contact structure 12, the arc envelops the lowermost portion of arc runner 31 thereby transferring the arc terminal from arcing contact 22 to arc runner 31 and inserting blowout coil 29 in the arcing circuit. The arcing circuit is now completed through the bar 27 which connects the blowout coil 29 with the lower terminal extension 32.

The arcing contact structure and the arc chute of the circuit breaker structure are mounted on a supporting ntructure comprising a fabricated vehicular base structure 35. Mounted on base structure 35 is the circuit breaker operator 18 which may be a motor driven circuit breaker movable contact actuating means. A pair of dual purpose substantially vertical or diagonal tubular members 36 (one of which is shown in FIG. 1) are provided on base structure 35. Members 36 are connected to a horizontally arranged manifold 39 which supports a pair of horizontal cross bracing means 37 (only one of which is shown in FIG. 1). The circuit breaker elements comprising the movable contact mechanism of the circuit breaker and the arc chute are mounted on the horizontal cross bracing means 37 and the manifold 39. Members 36 in addition to supporting the circuit breaker, further collect and distribute to a zone of arc initiation fluid under pressure from a source of fluid under pressure such as a suitable pneumatic means 38 used for aiding in cooling and extinguishing an arc drawn by the circuit breaker elements between the arcing contacts.

This pneumatic means may be an air pump comprising a cylinder 40 mounted on base structure 35 and a piston 41 movable in cylinder 40. Piston 41 is biased in contact opening direction by an operating spring 42 which is the means for opening the circuit breaker. The motor operating means 18 through crank 17 returns piston 41 to its upper position simultaneously with a circuit breaker closing operation, thereby placing spring 42 under tension so it is capable of again opening the circuit breaker contacts. Any suitable means such as pipe connections 45 may be used for connecting the substantially vertically arranged tubular members 36 to the source of fluid under pressure, namely cylinders 40. For the purpose of aiding in the interrupting of the arc the switch arm or movable contact structure 12 is connected to piston 41 through operating rod 16 and crank 17. Upon the movement of contact structure 12 from closed to open circuit position under the action of springs 42, piston 41 is actuated and moved from the top of cylinder 40 to the bottom of cylinder 40. This movement of piston 41 causes air in cylinder 40 under piston 41 to flow through pipe connections 45, tubular member 36, manifold 39, tubular member 46, bearing 43, tubular member 47 and nozzle 44 to the zone of arc initiation.

Arc chute 26 is provided with a group of slotted, spaced insulating plates 48 arranged to extend longitudinally of the axis of the chute and transversely to the arc at the arc receiving end thereof and a pair of chimney vents 49 and 50 arranged longitudinally of the axis of the chute one adjacent each of the arc runners 30 and 31. The insulating barrier plates 48 may be arranged in a combination having a plurality of types of barrier plates having different geometrical configurations. Slots 51 of barrier plates 48 are aligned at their upstream ends adjacent the zone of arc initiation to form an arc passage. As well known in the art, the slots may be arranged in staggered relationship at their downstream ends. This out of registry or staggered relationship of the slots causes the formation of a zigzazg shaped arc path.

The operating mechanism 18 comprises a pinion or driving shaft 50 having fixedly mounted thereon a cam means 51. Shaft 50 is rotated by means of an electric motor 52 through a suitable gear train 52a or by means of a manually rotatable crank or handle 52b. Upon clockwise rotation of cam means 51, as shown in the drawings, it engages a latch roller 53 which is mounted at one end on a pivotally mounted walking beam 54. Walking beam 54 is pivotally connected at one end to a connecting rod 55 which is driven to the left as shown in the drawings upon clockwise rotation of cam means 51 and engagement thereby of latch roller 53. Connecting rod 55 is mounted in the housing 56 of the circuit breaker base structure 35.

The motion of connecting rod 55 to the left compresses a pair of load spring means (stored energy devices) 57 and 58 which are coaxially mounted around connecting rod 55 and so arranged that they function as a unit. A latch roll 59 is pivotally attached to the end of a link 61 of an overcenter toggle 62. The other link 63 of toggle 62 is integral with walking beam 54 and pivots with walking beam about point 64 between the ends thereof. When spring means 57 and 58 are fully charged by the rotation of walking beam 54 clockwise to the position shown in FIG. 2, toggle 62 is moved until latch roll 59 engages a prop latch 65 which holds the fully charged springs latched and ready to be discharged to perform a useful function, for example, closing of the movable cooperating contact structures 11 and 12 of the circuit breaker. The prop latch 65 may be released or tripped by a solenoid mechanism (not shown) upon movement of its armature 65′. The release of prop latch 65 from its position shown in FIGS. 1 and 2 permits connecting rod 55 to move to the right as shown in the drawings. This action causes walking beam 54 to rotate counterclockwise under the force of spring means 57 and 58. Once the stored energy of load spring means 57 and 58 has been released the spring means can again be recharged automatically by motor 52 or manually by the handle 52b as explained above.

After the cam means 51 has rotated its high point 66 beyond latch roller 53 and spring means 57 and 58 have been fully charged and the prop latch 65 has held them in position, motor 52 is deenergized by a suitable switch (not shown) mechanically associated with cam means 51.

As shown in FIGS. 1 and 2 contact structures 11 and 12 are in their contact open position when the stored energy spring means 57 and 58 are charged. Spring means 57 and 58 are connected to the contact structures 11 and 12 by means of an overcenter toggle 70. One link 71 of toggle 70 is connected to crank 17 which is pivotally mounted at 72 to the housing 56 of the circuit breaker structure. The other link 73 of toggle 70 is pivotally mounted on one end of crank 74 which in turn is pivotally mounted at point 75 to the housing of the circuit breaker structure. An arm 76 is pivotally mounted at one end to the frame of the circuit breaker structure at point 75 and is pivotally connected at its other end to the roller end of overcenter toggle 62.

When prop latch 65 is released by the solenoid mechanism (not shown) and rotates clockwise it releases latch roller 59. Roller 59 and link 61 of overcenter toggle 62 rotate clockwise coming in contact with a latch roller 77 which interconnects links 71 and 73 and forms the knee of overcenter toggle 70. Latch roller 59 drives latch roller 77 and overcenter toggle 70 past its overcenter position until roller 77 reaches arcuate stop 78 as shown in FIG. 3. The movement of toggle 70 to its overcenter position causes crank 17 to rotate counterclockwise to cause engagement of the contact structures 11 and 12.

At the instant that overcenter toggle 70 is moved to its overcenter position against stop 78, latch roll 79 mounted on pin 80 interconnecting link 73 of toggle 70 and crank 74 engages a prop latch 81 affixed to the housing of the circuit breaker, thus holding the contact structures 11 and 12 latched closed against the force of their contact opening spring 42. Spring 42 which is diagrammatically illustrated as being connected between crank 17 and the housing of the circuit breaker structure is charged by the contact closing mechanism described. Upon release of toggle 70 from its overcenter position by prop latch 81 spring 42 opens the contact structure. The prop latch 81 may be released or tripped by a solenoid mechanism 82 which upon movement of its armature 83 downward as shown in FIGS. 1 through 3 actuates the prop latch 81 to rotate it clockwise releasing latch roll 80, thereby permitting the overcenter toggle 70 to collapse to the position shown in FIGS. 1 and 2. Upon deenergization of solenoid mechanism 82, armature 83 assumes its normal position shown in FIGS. 1 through 3 and spring 84 on latch prop 81 biases it back to its latch engaging position shown.

In accordance with the invention claimed motor 52 is energized whenever the spring means 57 and 58 are discharged. This occurs by the use of an electrical switch (not shown) associated with the position of cam means 51. Thus, motor 52 through its associated gearing 52a rotates cam means 51 clockwise to drive the high spot 66 of cam means 51 against latch roller 53. This action causes clockwise rotation of walking beam 54 and axial movement to the left of connecting rod 55 thereby charging spring means 57 and 58. During the spring charging operation prop latch 65 holds latch roller 59 and toggle 62 in a given position and motor 52 drives cam means 51 clockwise until it reaches the cam position shown in FIG. 3 whereupon motor 52 is deenergized. Upon release of latch prop 65 by a solenoid mechanism similar to mechanism 82, toggle 62 is moved to the overcenter toggle position shown in FIG. 3 thereby driving by means of latch roll 59 on toggle 62, latch roller 77 and toggle 70 to their overcenter position against stop 78. The movement of toggle 70 to its overcenter position causes the closing of the contact structures 11 and 12.

As soon as the contact structures 11 and 12 have been closed and their opening spring 42 charged upon movement of toggle 62 to its overcenter position, motor 52 is energized and spring means 57 and 58 recharged. However, if the toggle 62 remains in its overcenter position as shown in FIGS. 3 and 4 the contact structures 11 and 12 may be tripped open by energizing solenoid mechanism 82 resulting in clockwise rotation of prop latch 81. Release of crank 74 causes clockwise rotation thereof under the force of spring 42 resulting in opening of contact mechanisms 11 and 12 without interference with toggle 62. The resulting trip free movement of contact mechanisms 11 and 12 is shown in FIG. 4.

As noted from the drawing, rotation of less than one revolution of cam means 51 charges spring means 57 and 58. For the cam means used only three-fourths of one revolution is needed. The cam means 51 is so provided that an equal torque is imposed on motor 52 for the whole three quarters of the revolution in question. Energy is impressed on the springs at an equal rate throughout the charge revolution of motor 52. Further by the use of a double toggle mechanism in combination with spring stored energy devices the contact closing operation is accomplished by the release of energy from spring means 57 and 58. This occurs as toggles 62 and 70 are moved to their overcenter positions. Thus, as spring means 57 and 58 reach their most weakened condition (their energy almost completely spent) the toggle mechanisms reach their highest mechanical advantage. A large contact closing force is available near contact closed position on springs which have given up most of their energy.

Although but one embodiment of the present invention has been illustrated and described, it will be apparent to those skilled in the art that various changes and modifications may be made therein without departing from the spirit of the invention or from the scope of the appended claims.

Having now particularly described and ascertained the nature of my said invention and the manner in which it is to be performed, I declare that what I claim is:

1. An operating mechanism comprising in combination a base structure, a force transmitting structure mounted on said base structure, tripping means controlling said structure, said tripping means comprising a first collapsible toggle having one link thereof connected to said structure, spring means connected to said force transmitting structure and to said base structure for causing collapse of said first toggle and actuation of said structure in one direction, means including a latch for preventing collapse of said first toggle, means for actuating said latch to release said first toggle, actuating means for driving said first toggle to overcenter position to actuate said structure in a second direction and to charge said spring, said actuating means comprising a second overcenter toggle operating separately from said first toggle for engaging said first toggle during movement of said first toggle to its overcenter position.

2. An operating mechanism comprising in combination a base structure, a force transmitting structure mounted on said base structure, tripping means controlling said structure, said tripping means comprising a first collapsible toggle having one link thereof connected to said structure, spring means connected to said force transmitting structure and to said base structure for causing collapse of said first toggle and actuation of said structure in one direction, means including a latch for preventing collapse of said first toggle, means for actuating said latch to release said first toggle, actuating means for driving said first toggle to overcenter position to actuate said structure in a second direction and to charge said spring, said actuating means comprising a second overcenter toggle operating separately from said first toggle for engaging the knee of said first toggle to drive said first toggle to said overcenter position.

3. An operating mechanism comprising in combination a base structure, a force transmitting structure mounted on said base structure, tripping means controlling said structure, said tripping means comprising a first collapsible toggle having one link thereof connected to said structure, spring means connected to said force transmitting structure and to said base structure for causing collapse of said first toggle and actuation of said structure in one direction, means including a latch for preventing collapse of said first toggle, means for actuating said latch to release said first toggle, actuating means for driving said first toggle to overcenter position to actuate said structure in a second direction and to charge said spring, said actuating means comprising a second overcenter toggle operating separately from said first toggle for engaging the knee of said first toggle to drive said first toggle to its overcenter position, and cam means for actuating said second toggle to its overcenter position.

4. An operating mechanism comprising in combination a base structure, a force transmitting structure mounted on said base structure, tripping means controlling said structure, said tripping means comprising a first collapsible toggle having one link thereof connected to said structure, spring means connected to said force transmitting structure and to said base structure for causing collapse of said first toggle and actuation of said structure in one direction, means including a latch for preventing collapse of said first toggle, means for actuating said latch to release said first toggle, actuating means for driving said first toggle to overcenter position to actuate said structure in a second direction and to charge said spring, said actuating means comprising a motor, a cam structure rotatively attached to said motor and a second overcenter toggle operating separately from said first toggle, said motor actuating said cam structure to actuate said second toggle to its overcenter position, said second toggle upon actuation to overcenter position engaging said first toggle to drive said first toggle to its overcenter position.

5. A circuit breaker structure comprising in combination a base structure, a pair of cooperating relatively movable contacts mounted on said base structure, tripping means for controlling at least one of said contacts, said tripping means comprising a first collapsible toggle having one link thereof connected to said one of said contacts, a first spring means connected to said one of said contacts and to said base structure for opening said contacts upon bias thereof and for causing collapse of said first toggle, means including a latch for preventing collapse of said first toggle, means for actuating said latch to release said first toggle, and actuating means for driving said first toggle to its overcenter position to actuate said contacts to contact closed position and to charge said first spring, said actuating means comprising a second spring means biased upon predetermined movement of said actuating means and a second overcenter toggle operating separately from said first toggle, said second spring means when released causing said second toggle to engage said first toggle to drive said first toggle to its overcenter position.

6. A circuit breaker structure comprising in combination a base structure, a pair of cooperating relatively movable contacts mounted on said base structure, tripping means for controlling at least one of said contacts, said tripping means comprising a first collapsible toggle having one link thereof connected to said one of said contacts, a first spring means connected to said one of said contacts and to said base structure for opening said contacts upon bias thereof and for causing collapse of said first toggle, means including a latch for preventing collapse of said first toggle, means for actuating said latch to release said first toggle, and actuating means for driving said first toggle to its overcenter position to actuate said contacts to contact closed position and to charge said first spring, said actuating means comprising a motor, a cam structure movably attached to said motor, a second spring means, and a second overcenter toggle operating separately from said first toggle, said motor actuating said cam structure to bias said second spring means, said second spring means when released causing said second toggle to engage said first toggle to drive said first toggle to its overcenter position.

7. A circuit breaker structure comprising in combination a base structure, a pair of cooperating relatively movable contacts mounted on said base structure, tripping means for controlling at least one of said contacts, said tripping means comprising a first collapsible toggle having one link thereof connected to said one of said contacts, a first spring means connected to said one of said contacts and to said base structure for opening said contacts upon bias thereof and for causing collapse of said first toggle, means including a latch for preventing collapse of said first toggle, means for actuating said latch to release said first toggle, and actuating means for driving said first toggle to its overcenter position to actuate said contacts to contact closed position and to charge said first spring, said actuating means comprising a motor, a cam structure rotatively attached to said motor, a second spring means, and a second overcenter toggle operating separately from said first toggle, said motor actuating said cam structure to bias said second spring means, said second spring means when released causing said second toggle to engage the knee of said first toggle to drive said first toggle to its overcenter position.

8. An operating mechanism comprising in combination a base structure, a force transmitting structure mounted on said base structure, tripping means controlling said structure, said tripping means comprising a first collapsible toggle having one link thereof connected to said structure, a first spring means connected to said force transmitting structure and to said base structure for causing collapse of said first toggle and actuation of said structure in one direction, means including a latch for preventing collapse of said first toggle, means for actuating said latch to release said first toggle, actuating means for driving said first toggle to its overcenter position to actuate said structure in a second direction and to charge said spring, said actuating means comprising a motor, a cam structure movably attached to said motor, a second spring means, and a second overcenter toggle operating separately from said first toggle, said motor actuating said cam structure to bias said second spring means, said second spring means when released causing said second toggle to engage said first toggle to drive said first toggle to its overcenter position.

References Cited by the Examiner
UNITED STATES PATENTS
3,113,191  12/63  Frank _____ 200—153

BERNARD A. GILHEANY, *Primary Examiner.*